E. F. NIEDECKEN.
MIXING VALVE.
APPLICATION FILED MAY 24, 1916.
1,321,238.
Patented Nov. 11, 1919.
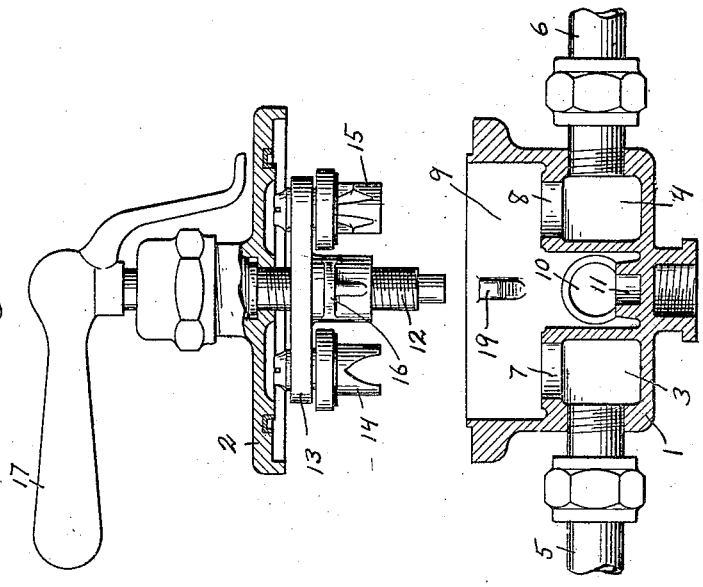
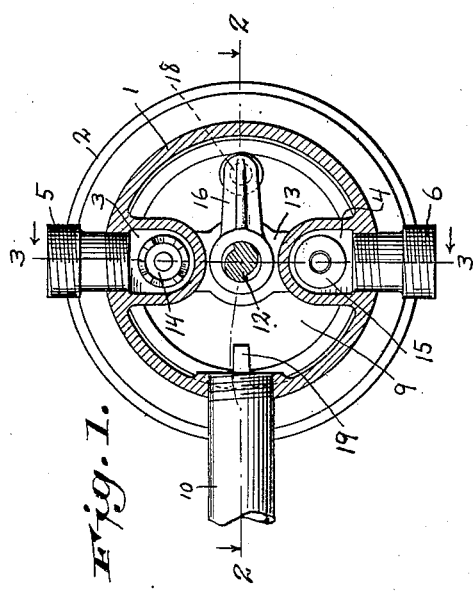
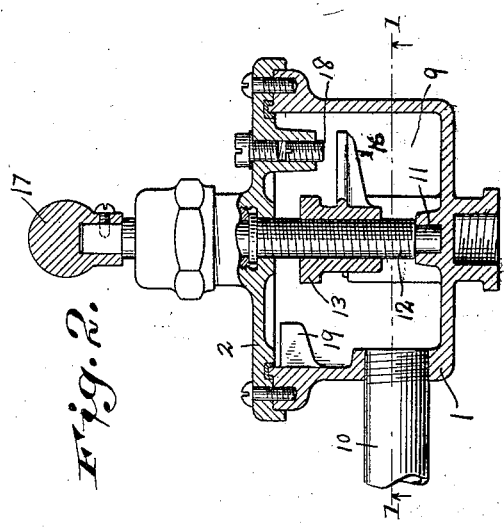
Inventor
Edward F. Niedecken,
By Flanders, Bottum, Fawsett & Bottum,
Attorneys.

UNITED STATES PATENT OFFICE.

EDWARD F. NIEDECKEN, OF MILWAUKEE, WISCONSIN.

MIXING-VALVE.

1,321,238.          Specification of Letters Patent.          Patented Nov. 11, 1919.

Application filed May 24, 1916. Serial No. 99,512.

*To all whom it may concern:*

Be it known that I, EDWARD F. NIEDECKEN, a citizen of the United States, residing at Milwaukee, in the county of Milwaukee and State of Wisconsin, have invented certain new and useful Improvements in Mixing-Valves, of which the following is a specification, reference being had to the accompanying drawing, forming a part thereof.

This invention relates to mixing valves, and the objects of the invention are to provide a construction to prevent an incorrect assembling of the valve mechanism.

This invention is an improvement in the construction of mixing valves of the type illustrated and described by prior Letters Patent of the United States granted to me August 22, 1911, and numbered 1,001,431, in which construction the valve plugs for the hot and cold water supply ports are of the same size.

It sometimes happens that when such a mixing valve has been disassembled, the person who is reassembling the valve is careless, or does not know the proper construction of the valve, and in assembling the parts the valve plugs which are carried by the cover are turned 180 degrees from their proper position, so that the cold water plug is assembled with the hot water port, and the hot water plug is assembled with the cold water port. It is the object of this invention to prevent the parts of the valve from being assembled incorrectly.

Referring to the drawings which accompany this specification and form a part hereof and on which drawings the same reference characters are used to designate the same parts wherever they may appear in each of the several views, and which drawings illustrate an embodiment of this invention, Figure 1 is a horizontal section taken on the line 1—1 on Fig. 2, looking in the direction indicated by the arrows; Fig. 2 is a vertical section taken on the line 2—2 on Fig. 1, looking in the direction indicated by the arrows; and Fig. 3 is a vertical section taken on the line 3—3 on Fig. 1, looking in the direction indicated by the arrows, the cover and parts carried thereby being illustrated as separated from the casing.

Referring to the drawings, the reference numeral 1 designates a casing open at its top and adapted to be closed by the cover 2. The casing 1 is provided with a hot water chamber 3 and a cold water chamber 4, with which the hot water pipe 5 and the cold water pipe 6 respectively communicate, and the ports 7 and 8 permit hot and cold water to flow from the chambers 3 and 4 into the mixing chamber 9 according to the positions of the valve plugs which control the flow of water through said ports. The casing 1 is provided with a single outlet 10, and a step 11 for the valve spindle 12, which is carried by the cover 2 and which is screw-threaded so as to move the arm 13 up or down in the ordinary manner. The arm 13 carries the hot water plug 14, the cold water plug 15 and the stop arm 16, and turning the handle 17 rotates the screw-threaded valve spindle 12 and screws the arm 13 with the plugs 14 and 15 and the stop arm 16 up and down in the ordinary manner. The stop arm 16 is adapted to contact with an adjustable stop screw 18, carried by the cover, and when the cover with the valve stem and other parts carried thereby are disassembled from the casing 1, the stop arm 16 and the stop screw 18 can be readily observed, so that the relation of these parts can be properly provided for in reassembling the valve, but the difficulty which has been encountered is that the entire cover with the valve plugs and stop arm 16, have been turned around 180 degrees in reassembling the valve, so that the hot water plug 14 is placed in the cold water port 8, and the cold water plug 15 is placed in the hot water port 7, whereby the valve does not function as intended.

To obviate this difficulty I form the valve casing 1 in such a manner that the cover 2 and parts carried thereby, can only be assembled with the casing 1 in such a position that the hot water plug will have to be inserted in the hot water port, and the cold water plug will have to be inserted in the cold water port, and in the construction illustrated and described, I take advantage of the presence of the stop arm 16 to form a guide when assembling the cover 2 with the casing 1, and form the casing 1 so that the valve plugs 14 and 15 and the stop arm 16 can only be inserted therein in one position and cannot be inserted therein with the stop arm 16 turned 180 degrees from its proper position, with the consequent change of the valve plugs to the ports with which they are not intended to coact.

I accomplish this result in the construction illustrated by my Letters Patent No. 1,001,431 hereinbefore referred to, by providing a projection 19 on the interior of the casing 1 and diametrically opposite the position in said casing occupied by the stop arm 16. It is readily apparent that when the cover 2 and the parts carried thereby are assembled with the casing 1, that the valve plugs 14 and 15 must register with the ports 7 and 8 respectively, because if it be attempted to register plug 14 with port 8, and plug 15 with port 7, the stop arm 16 will be turned 180 degrees from its proper position, and will contact with the projection 19, and the cover 2 cannot be placed in position on the casing.

What is claimed is:

In a mixing valve, the combination with a casing provided with a hot water port and a cold water port, of a hot water plug and a cold water plug of equal sizes, and an arm carrying said plugs, said arm and the casing being provided with parts adapted to contact to prevent the cold water plug from being assembled with the hot water port.

In witness whereof I hereunto affix my signature in presence of two witnesses.

EDWARD F. NIEDECKEN.

Witnesses:
CHAS. L. GOSS,
FRANK E. DENNETT.

Copies of this patent may be obtained for five cents each, by addressing the "Commissioner of Patents, Washington, D. C."